(12) United States Patent
Hatambeiki et al.

(10) Patent No.: US 9,582,989 B2
(45) Date of Patent: *Feb. 28, 2017

(54) SYSTEM AND METHODS FOR ENHANCED REMOTE CONTROL FUNCTIONALITY

(71) Applicant: UNIVERSAL ELECTRONICS INC., Santa Ana, CA (US)

(72) Inventors: Arsham Hatambeiki, Irvine, CA (US); Jeffrey Kohanek, Westminster, CA (US); Pamela Eichler Keiles, Long Beach, CA (US); Ramzi Ammari, Newport Coast, CA (US)

(73) Assignee: Universal Electronics Inc., Santa Ana, CA (US)

( * ) Notice: Subject to any disclaimer, the term of this patent is extended or adjusted under 35 U.S.C. 154(b) by 693 days.

This patent is subject to a terminal disclaimer.

(21) Appl. No.: 13/785,045

(22) Filed: Mar. 5, 2013

(65) Prior Publication Data

US 2013/0185669 A1 Jul. 18, 2013

Related U.S. Application Data

(63) Continuation of application No. 12/849,497, filed on Aug. 3, 2010.

(Continued)

(51) Int. Cl.
*G06F 3/048* (2013.01)
*G08C 17/02* (2006.01)
(Continued)

(52) U.S. Cl.
CPC ............... *G08C 17/02* (2013.01); *G06F 3/02* (2013.01); *G06F 3/0346* (2013.01);
(Continued)

(58) Field of Classification Search
CPC ...... G06F 3/02; G06F 3/0346; G06F 3/03547; G06F 3/0383; G06F 3/0484; H04M 1/0231; H04M 2250/18
See application file for complete search history.

(56) References Cited

U.S. PATENT DOCUMENTS 6,504,488 B2 * 1/2003 Troedel ............... H04B 1/088
340/815.49
6,919,817 B2 7/2005 Choi et al.
(Continued)

OTHER PUBLICATIONS

The International Bureau of WIPO, Int. Preliminary Report on Patentability of PCT Application No. US2011/32059, received Dec. 13, 2012, 7 pgs.

(Continued)

*Primary Examiner* — William Bashore
*Assistant Examiner* — Rayeez Chowdhury
(74) *Attorney, Agent, or Firm* — Greenberg Traurig, LLP

(57) ABSTRACT

A hand-held device has a housing having a top surface and a bottom surface opposite the top surface, at least one transmitter, a first user interface associated with the top surface of the housing having first user interface input elements which, when active, are actuatable to cause the at least one transmitter to transmit communications to an external device, and a second user interface associated with the bottom surface of the housing having second user interface input elements which, when active, are actuatable to cause the at least one transmitter to transmit communications to an external device. The hand-held device is programmed to selectively make one of the first user interface input elements of the first user interface and the second user interface input elements of the second user interface active while making the other of the first user interface input elements of the first user interface and the second user (Continued)

interface input elements of the second user interface inactive.

10 Claims, 7 Drawing Sheets

Related U.S. Application Data

(60) Provisional application No. 61/333,567, filed on May 11, 2010.

(51) Int. Cl.
| | |
|---|---|
| G06F 3/0346 | (2013.01) |
| G06F 3/0354 | (2013.01) |
| G06F 3/038 | (2013.01) |
| G08C 19/00 | (2006.01) |
| G06F 3/02 | (2006.01) |
| H04N 5/44 | (2011.01) |
| H04N 21/422 | (2011.01) |
| G06F 3/0484 | (2013.01) |

(52) U.S. Cl.
CPC ........ G06F 3/0383 (2013.01); G06F 3/03547 (2013.01); G08C 19/00 (2013.01); H04N 5/4403 (2013.01); H04N 21/42222 (2013.01); H04N 21/42224 (2013.01); G06F 3/0484 (2013.01); G08C 2201/30 (2013.01); G08C 2201/50 (2013.01); G08C 2201/51 (2013.01); G08C 2201/92 (2013.01); H04N 2005/443 (2013.01); H04N 2005/4428 (2013.01)

(56) References Cited

U.S. PATENT DOCUMENTS

| | | | |
|---|---|---|---|
| 7,115,032 B2 * | 10/2006 | Cantu | A63F 13/10 273/432 |
| 7,319,426 B2 | 1/2008 | Garfio | |
| 7,425,947 B1 | 9/2008 | Tseng et al. | |
| 7,579,961 B2 | 8/2009 | Krzyzanowski et al. | |
| 8,155,692 B1 * | 4/2012 | Roka | H04M 1/0231 455/550.1 |
| 2002/0003471 A1 * | 1/2002 | Troedel | H04B 1/088 340/425.5 |
| 2002/0118175 A1 | 8/2002 | Liebenow et al. | |
| 2003/0034878 A1 | 2/2003 | Hull et al. | |
| 2004/0208681 A1 | 10/2004 | Dechene | |
| 2005/0057489 A1 | 3/2005 | Kung et al. | |
| 2005/0216606 A1 | 9/2005 | Hayes et al. | |
| 2005/0283551 A1 | 12/2005 | Oh | |
| 2007/0030251 A1 | 2/2007 | Henty | |
| 2007/0070046 A1 | 3/2007 | Sheynblat et al. | |
| 2007/0070066 A1 | 3/2007 | Bakhash | |
| 2007/0245380 A1 | 10/2007 | Dommer et al. | |
| 2007/0273561 A1 | 11/2007 | Philipp | |
| 2008/0151125 A1 | 6/2008 | Bucchieri | |
| 2009/0234503 A1 | 9/2009 | Chen et al. | |
| 2009/0262073 A1 | 10/2009 | Rigazio et al. | |
| 2009/0303097 A1 | 12/2009 | Reams et al. | |
| 2010/0164745 A1 * | 7/2010 | Migos | G08C 17/00 340/12.22 |
| 2010/0201712 A1 | 8/2010 | Grignani et al. | |
| 2011/0117999 A1 * | 5/2011 | Anderson | G07F 17/32 463/20 |

OTHER PUBLICATIONS

U.S. Patent and Trademark Office, Office Action issued on U.S. Appl. No. 12/849,438, dated Apr. 10, 2013, 8 pages.
Chinese Patent Office, Office Action issued on Chinese patent application No. 201180023527.0, dated Jul. 22, 2015, 12 pages.
Chinese Patent Office, Office Action issued on Chinese patent application No. 201180023527.0, dated Jan. 5, 2015, 13 pages.
USPTO, Office Action issued on U.S. Appl. No. 13/851,571, dated May 13, 2015, 11 pages.
USPTO, Office Action issued on U.S. Appl. No. 13/851,571, dated Feb. 3, 2015, 11 pages.
USPTO, Office Action issued on U.S. Appl. No. 13/851,571, dated Oct. 21, 2014, 8 pages.
USPTO, Office Action issued on U.S. Appl. No. 13/851,601, dated Jan. 26, 2015, 18 pages.
European Patent Office, extended Search Report issued on European patent application No. 11780982.2, dated Oct. 8, 2013, 7 pages.
European Patent Office, extended Search Report issued on European patent application No. 11780983.0, dated Oct. 8, 2013, 7 pages.

* cited by examiner

SYSTEM AND METHODS FOR ENHANCED REMOTE CONTROL FUNCTIONALITY

RELATED APPLICATION INFORMATION

This application claims the benefit of and is a continuation of U.S. application Ser. No. 12/849,497, filed on Aug. 3, 2010, which claims the benefit of U.S. Provisional Application No. 61/333,567 filed May 11, 2010 the disclosures of which are incorporated herein by reference in the entirety.

BACKGROUND

Controlling devices, for example remote controls, for use in issuing commands to entertainment and other appliances, and the features and functionality provided by such controlling devices are well known in the art. Traditionally, user input means on such controlling devices has comprised a series of command function keys each of which may result in the transmission of a specific appliance command when activated. Increasingly in today's environment, such controlling devices are further used to interact with displayed menu systems, browse web pages, manipulate pointers, and perform other similar activities which may require both navigational input, e.g., to scroll displayed information on a screen, to move a pointer, to zoom in or out, etc., and entry of text data such as URLs, search terms, messages, etc. Although entry of text data and input of navigation operations may be possible using conventional controlling device input mechanisms, for example by assigning groups of alphabetic characters to numeric keys in the style of a telephone keypad and the use of up, down, left, and right arrow keys, such methods tend to be tedious and in many instances the user experience may be improved by the provision of input mechanisms which are better suited to this type of activity.

SUMMARY

In accordance with this and other needs, the following generally describes a system and method for providing improved command, navigation and text input functionality on a controlling device. To this end, in addition to a conventional key matrix for receiving command function inputs as is well known in the art, a controlling device may be provided with navigation-specific input means, such as for example those described in co-pending U.S. patent application Ser. Nos. 12/552,761 and 12/645,037 both of which are hereby incorporated herein in their entirety, an alphanumeric keyboard to facilitate entry of text data, and in some embodiments motion and/or orientation sensing accelerometer means. In one preferred embodiment described herein, the controlling device may be two-sided, with command function keys and navigation input means being located on one surface and alphanumeric keyboard keys being located on an opposite surface. Alternative layouts are however possible. To enhance usability and prevent inadvertent actuation of keys, such a controlling device may be adapted to selectively enable and disable all or a portion of the command function keys, keyboard keys, navigation input devices, or other user input means located on one or the other surface based upon orientation of the controlling device, user input, target appliance status, etc. In certain embodiments incorporating accelerometer means, the accelerometer may be utilized not only to detect changes in orientation of the controlling device for the purposes described above, but may also be used as an additional source of user input as will be described in greater detail hereafter. Furthermore, in those embodiments comprising a touch sensitive input means, enhanced decoding methods may be applied to reduce the likelihood of false input due to inconsequential user touch or finger proximity while reaching for a key location.

A better understanding of the objects, advantages, features, properties and relationships of the invention hereinafter claimed will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention hereinafter claimed, reference may be had to preferred embodiments shown in the attached drawings in which:

DETAILED DESCRIPTION

Figure 1:
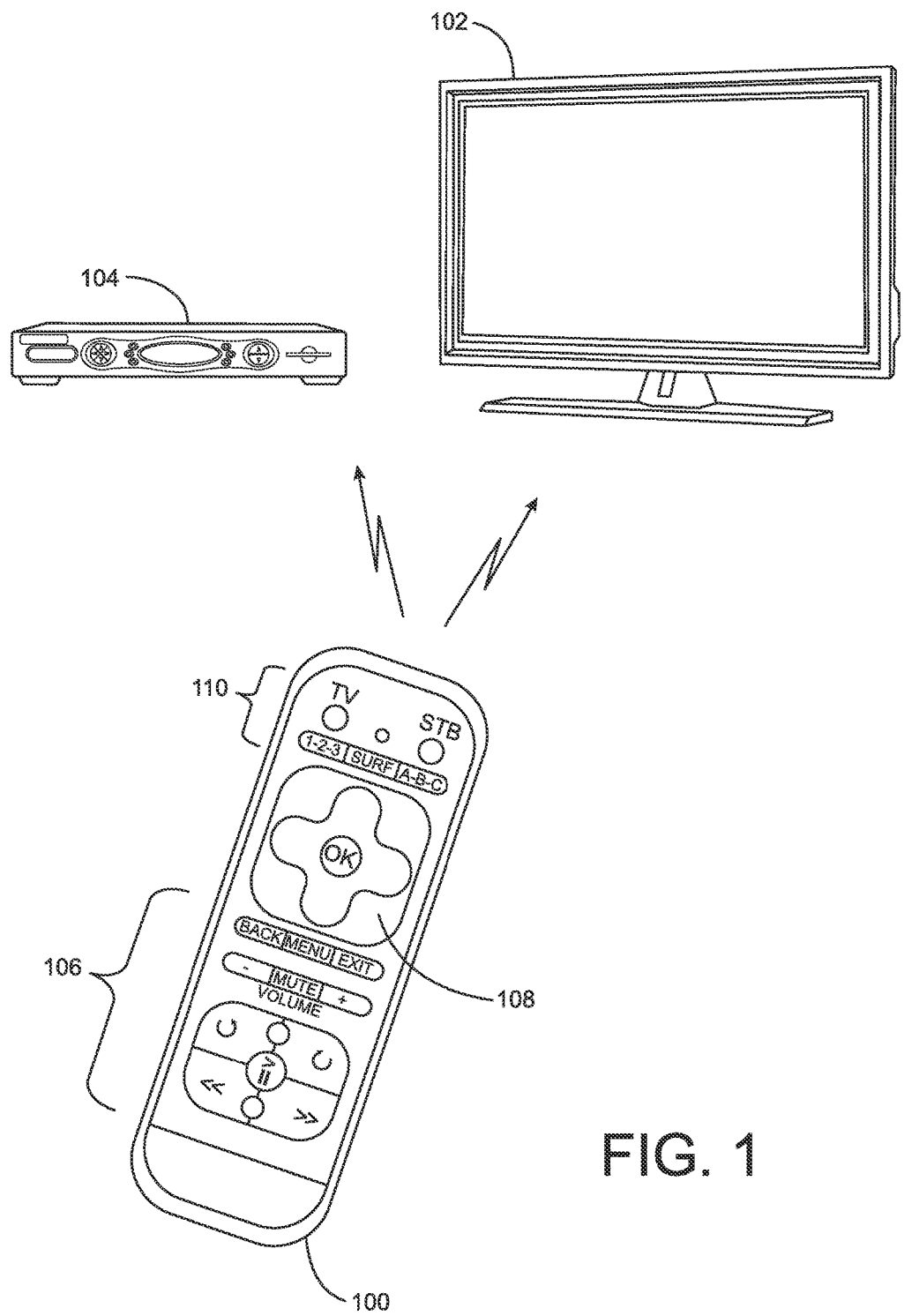
FIG. 1 illustrates an exemplary system in which an exemplary controlling device according to the instant invention may be used.

Turning now to FIG. 1, there is illustrated an exemplary system in which a controlling device 100 is configured to control various controllable appliances, such as for example a television 102 and a set top box ("STB") 104. As is known in the art, the controlling device 100 may be capable of transmitting commands to the appliances in response to user activation of various command function keys 106 using any convenient IR, RF, Point-to-Point, or networked protocol, to cause the appliances to perform operational functions. While illustrated in the context of a television 102 and STB 104, it is to be understood that controllable appliances may include, but need not be limited to, televisions, VCRs, DVRs, DVD players, cable or satellite converter set-top boxes ("STBs"), amplifiers, CD players, game consoles, home lighting, drapery, fans, HVAC systems, thermostats, personal computers, etc. As is known in the art, controlling device 100 may also include keys 110 for use in configuring the operation of controlling device 100, e.g., changing operational modes, selecting active key sets, etc. In a particular illustrative embodiment, in addition to conventional control functionality as known in the art, controlling device 100 may further include an input area 108 for generation of navigation commands to be transmitted from the controlling device 100 to one or more appliances in response to user interaction with that area, for example as described in the previously referenced pending U.S. patent application Ser. Nos. 12/552,761 and 12/645,037.

Figure 2:
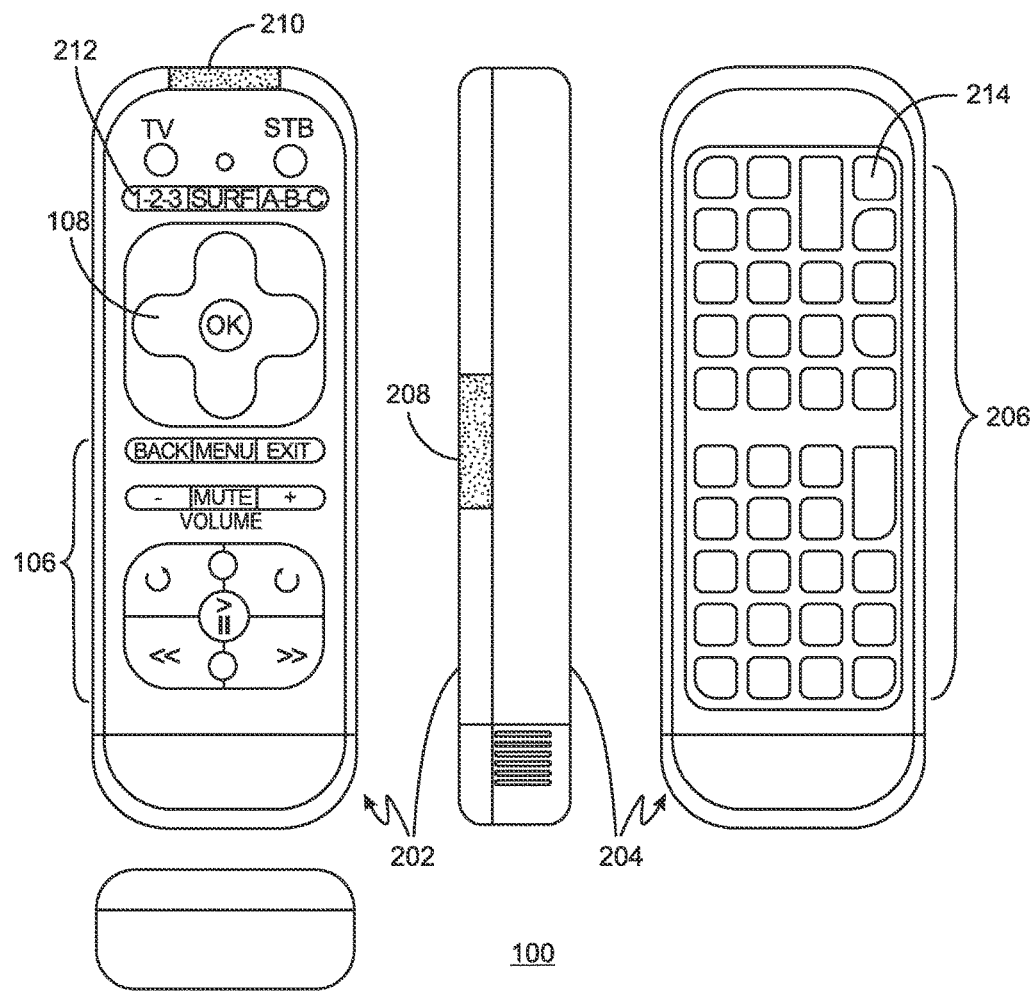
FIG. 2 illustrates the exemplary controlling device of FIG. 1 in greater detail.

With reference now to FIG. 2, in an exemplary embodiment controlling device 100 may further comprise multiple surfaces for receipt of user input, for example a first surface 202 which comprises command function keys 106 and navigation input means 108, and a second surface 204 located opposite said first surface and which comprises an alphanumeric keyboard 206 arranged by way of example only in a conventional "qwerty" manner. In such a two-sided embodiment, various explicit or implicit operational methods may be provided for selectively enabling and disabling the input means on each of these surfaces, which methods may be used either individually or in conjunction with one another, as will become apparent hereafter. Further, in certain embodiments, and in particular when infrared signaling is used as the communication method between controlling device 100 and target appliances such as TV 102 and/or STB 104, provision may be made for multiple transmitter or transceiver means, for example as illustrated at 208 (positioned by way of example only at a device front) and 210 (positioned by way of example only at a device side), in order to assure reliable communication regardless of the orientation of controlling device 100.

Figure 3:
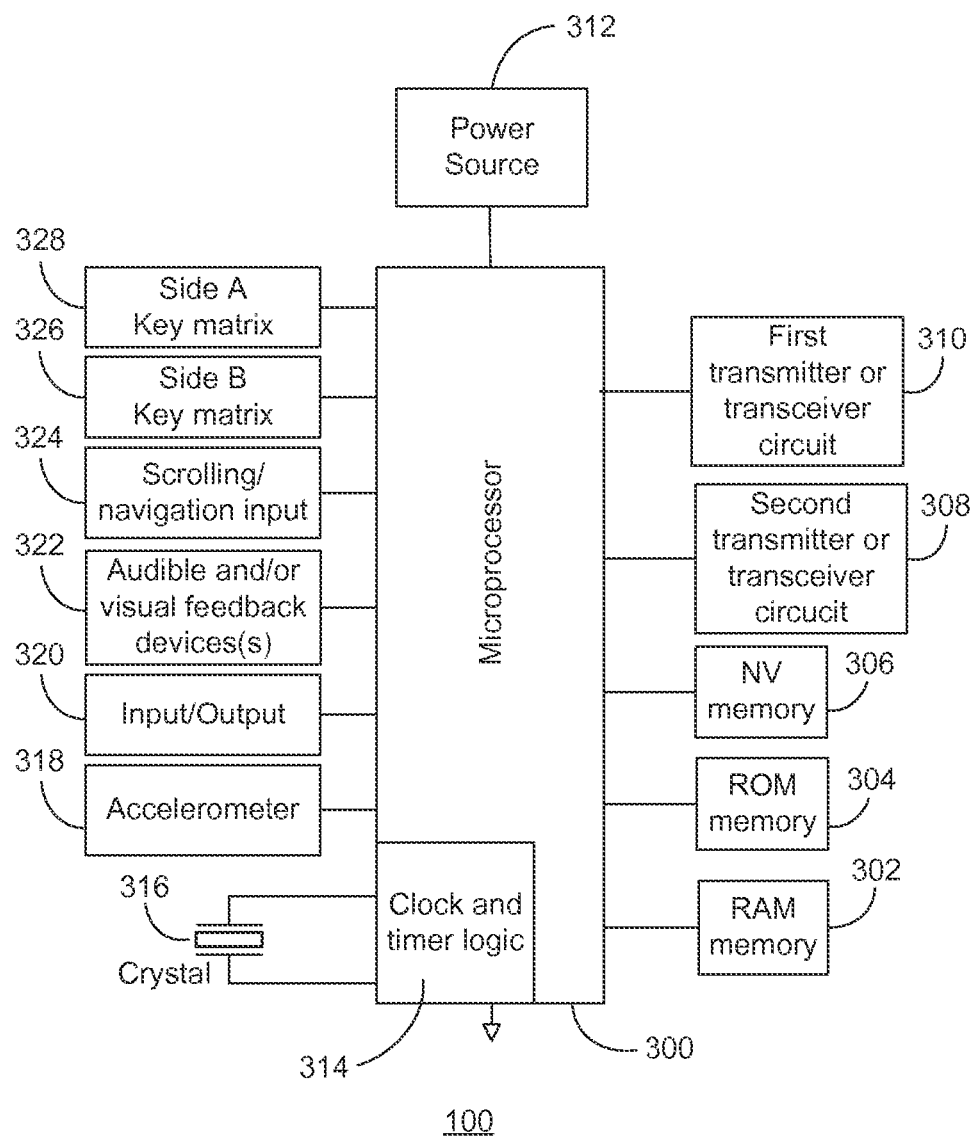
FIG. 3 illustrates a block diagram of exemplary components of the exemplary controlling device of FIGS. 1 and 2.

With reference to FIG. 3, for use in commanding the functional operations of one or more appliances, the controlling device 100 may include, as needed for a particular application, a processor 300 coupled to a ROM memory 304; a RAM memory 302; one or more key matrices 326,328 as required to support keys 206,106,110 on each of the multiple input surfaces (e.g., hard keys, soft keys such as a touch sensitive surface overlaid on a liquid crystal (LCD), and/or an electroluminescent (EL) display); a scrolling and/or navigation function input means 324 such as a capacitive or resistive touch sensor as required to support navigation input area 108; one or more transmission circuit(s) and/or transceiver circuit(s) 308,310 (e.g., IR and/or RF); a non-volatile read/write memory 306; means 322 to provide visual and/or audible feedback to the user (e.g., one or more LEDs, LCD display, speaker, piezoelectric buzzer, or the like); a power source 312; an input/output port 320 such as a serial interface, USB port, modem, Zigbee, WiFi, or Bluetooth transceiver, etc.; one or more means (not shown) for backlighting areas of touchpad 324 and/or key matrices 326,328; accelerometer means 318 for use in determining the motion and/or orientation of controlling device 100; and clock and timer logic 314 with associated crystal or resonator 316.

As will be understood by those skilled in the art, some or all of the memories 302, 304, 306 may include executable instructions that are intended to be executed by the processor 300 to control the operation of the remote control 100 (collectively, the operational software), as well as data which serves to define to the operational software the necessary control protocols and command values for use in transmitting command signals to controllable appliances (collectively, the command data). In this manner, the processor 300 may be programmed to control the various electronic components within the remote control 100, e.g., to monitor an active key matrix 326 or 328, to cause the transmission of signals, etc. The non-volatile read/write memory 306, for example an EEPROM, battery-backed up RAM, FLASH, Smart Card, memory stick, or the like, may additionally be provided to store setup data and parameters as necessary. While the memory 304 is illustrated and described as a ROM memory, memory 304 can also be comprised of any type of readable media, such as ROM, FLASH, EEPROM, or the like. Preferably, the memories 304 and 306 are non-volatile or battery-backed such that data is not required to be reloaded after disconnection of power source 312 as a result of battery change, etc. In addition, the memories 302, 304 and 306 may take the form of a chip, a hard disk, a magnetic disk, an optical disk, and/or the like. Still further, it will be appreciated that some or all of the illustrated memory devices may be physically combined (for example, a single FLASH memory may be logically partitioned into different portions to support the functionality of memories 304 and 306 respectively), and/or may be physically incorporated within the same IC chip as the microprocessor 300 (a so called "microcontroller") and, as such, they are shown separately in FIG. 3 only for the sake of clarity.

To cause the controlling device 100 to perform an action, the controlling device 100 may be adapted to be responsive to events, such as a sensed user interaction with the key matrices 326,328, touchpad 324, etc. In response to an event, appropriate operational software instructions within the program memory may be executed. For example, when a command function key or keyboard key is actuated on the controlling device 100, the operational software of controlling device 100 may retrieve from the command data stored in memory 302, 304, 306 a command value and control protocol corresponding to the actuated function or alphanumeric value and, where necessary, a current device mode, and will use the retrieved command data to transmit to an intended target appliance, e.g., STB 104, an operational command or alphanumeric value in a format recognizable by that appliance. It will be appreciated that the operational software may not only cause the transmission of commands and/or data to the appliances, but may also to perform local operations. While not limiting, local operations that may be performed by the controlling device 100 may include displaying information or data, favorite channel setup, macro key setup, function key relocation, etc. Examples of local operations can be found in U.S. Pat. Nos. 5,481,256, 5,959,751, and 6,014,092.

In some embodiments, controlling device 100 may be of the universal type, that is provisioned with a library comprising a multiplicity of command codes and protocols suitable for transmitting commands or alphanumeric values to various appliances. In such cases, for selecting sets of command data and protocols to be associated with the specific appliances to be controlled (hereafter referred to as a setup procedure), data may be entered into the controlling device 100 that serves to identify each intended target appliance by its make, and/or model, and/or type. The data may typically be entered via activation of those keys that are also used to cause the transmission of commands or alphanumeric values to an appliance, preferably the keys that are labeled with numerals. Such data allows the controlling device 100 to identify the appropriate command data set within the library of command data that is to be used to transmit recognizable commands in formats appropriate for such identified appliances. The library of command data may represent a plurality of controllable appliances of different types and manufacture, a plurality of controllable appliances of the same type but different manufacture, a plurality of appliances of the same manufacture but different type or model, etc., or any combination thereof as appropriate for a given embodiment. In conventional practice as is well known in the art, such data used to identify an appropriate command data and protocol set may take the form of a numeric setup code (obtained, for example, from a printed list of manufacturer names and/or models with corresponding code numbers, from a support Web site, etc.). Alternative setup procedures known in the art include scanning bar codes, sequentially transmitting a predetermined command in different formats until a target appliance response is detected, interaction with a Web site culminating in downloading of command data and/or setup codes to the controlling device, etc. Since such methods for setting up a controlling device to command the operation of specific home appliances are well-known, these will not be described in greater detail herein. Nevertheless, for additional information pertaining to setup procedures, the reader may turn, for example, to U.S. Pat. Nos. 4,959,810, 5,614,906, or 6,225,938 all of like assignee and incorporated herein by reference in their entirety.

Control Surface Selection.

During use of the exemplary multi-sided controlling device presented herein, it may be desirable that only a single input surface (e.g., one of command function and navigation surface 202 or alphanumeric keyboard surface 204 currently facing a user) be enabled, i.e., be active, for receipt of user input at any one point in time. In this manner, inadvertent issuance of appliance commands or data values due to a user's grasp on the other input surface of controlling device 100, e.g., the surface presently facing away from the user, may be inhibited. In order to offer a transparent and user-friendly interface, the operational software of exemplary controlling device 100 may implement some or all of the methods described below to determine which surface is to be considered as being currently active.

Explicit user action: A user may explicitly interact with one or more keys provided on one or more of the surfaces specifically for the purpose of activating a particular one of the surfaces. For example, in the illustrative controlling device of FIG. 2, the alphanumeric keyboard surface 204 may be activated by key 214, while the command function and navigation surface 202 may be activated by key 212. As will be appreciated, activation of one surface may implicitly deactivate the other surface. Alternate arrangements are also possible, for example, in other embodiments only a single key may be provided to toggle back and forth between surfaces or keys for activating either surface may be provided on only one of the surfaces. As will be appreciated, because in such alternative embodiments such key or keys may need to remain active even if the remaining keys of a corresponding surface are rendered inactive, it will be preferred that such key or keys be located in a position that would minimize inadvertent activation(s) thereof by a user.

Implicit user action: Detection of repetitive user activation of a key located on an inactive surface of the controlling device may trigger activation of that surface. For example, a first user key press on an inactive surface may be ignored as inadvertent. However a second user key press of the same key on the inactive surface within a short period of time and with no intervening activations of other keys may be interpreted as a signal to activate that inactive surface. In many instances such an algorithm may be essentially transparent to the user, since a natural reaction upon pressing a key, for example, an appliance function command, and getting no result, is to press the same key a second time.

Target or host appliance command: In certain embodiments where controlling device 100 is in bi-directional communication with the target appliance, e.g., STB 104, the target appliance may communicate its current operational status to the controlling device to cause automatic activation of a particular surface. For example, a user may utilize navigation input pad 108 on surface 202 to move to and select a text entry field displayed by STB 104 on TV 102. Upon selection of the text entry field, STB 104 may initiate a communication to the operational software of the controlling device to cause it to automatically disable command and navigation surface 202 and enable alphanumeric keyboard surface 204.

Internal detection of controlling device orientation: In embodiments which include accelerometer means 318, the operational software of controlling device 100 may utilize accelerometer derived data to track the orientation of controlling device 100 and enable whichever surface is currently facing generally upward.

In order to maximize user friendliness by providing optimum functionality, several of the above methods may be used in conjunction with one another and assigned relative priorities. For example, an explicit user action may always override an accelerometer-derived controlling device orientation. An exemplary method by which the operational software of a controlling device may appropriately provide prioritized support for all four surface enablement methods described above will now be presented with reference to the flowchart of FIG. 4, it being appreciated however that this represents only an illustrative set of surface enablement methods and priorities and that many other methods and prioritizations may be possible in alternate embodiments.

Figure 4:
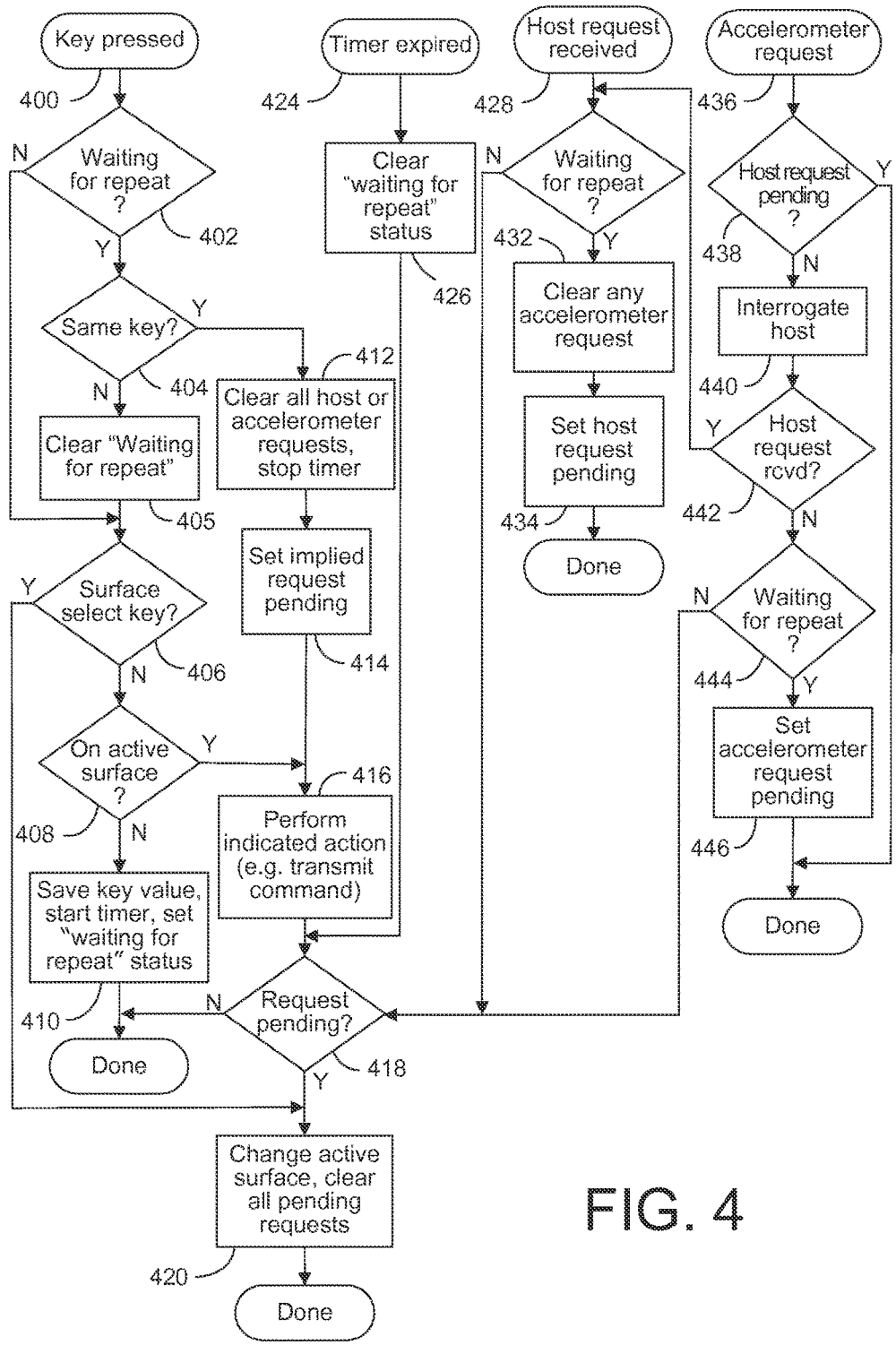
FIG. 4 illustrates in flow chart form an exemplary method for selection of an active input surface of a multi-surface controlling device.

Turning to FIG. 4, in an exemplary embodiment requests for surface selection may be prioritized in the order: explicit user input (highest), implicit user input, host/target appliance command, and accelerometer derived (lowest). Whenever a key activation 400 is detected by the operational software of controlling device 100 ("key" in this context being understood to broadly include any of physical button, touch screen icon, capacitive sense pad touch or navigation gesture, etc., without limitation), at step 402 it may first be determined by the operational software of controlling device 100 whether the current status of the controlling device is "waiting for repeat." As will become apparent later, this status may exist when controlling device 100 is in the midst of evaluating whether an implicit user surface selection is to be enacted. If the current status is not "waiting for repeat," then at step 406 it may next be determined if the activated key represents explicit user selection of an active surface, for example one of keys 212 or 214 in the case of the embodiment illustrated in FIG. 2. If so, at step 420 the desired active surface may be immediately selected and any other pending lower-priority requests cleared, after which processing is complete. It will be appreciated that in this context the selection of an input surface of a controlling device may comprise not only enablement of the keys and/or other input means located on that surface, but also any other action(s) necessary to fully realize the change of input surface. For example, in embodiments which utilize infrared-based communication between a controlling device 100 and target appliances, this may include enablement of specific IR transmitter or transceiver means appropriate to the current orientation of the controlling device, e.g., one of 208, 210 in the case of the embodiment illustrated in FIG. 2. In other embodiments, surface selection may also comprise transmission of an indication of the change to one or more of the target appliances, energizing backlighting for an active surface, altering header data in subsequent command transmissions to be indicative of surface origin, etc. as required for a particular implementation.

If however, the activated key is not an explicit surface selection key, at step 408 the operational software of controlling device 100 may next determine if the activated key is located on the currently enabled surface of the controlling device. If so, at step 416 the key activation is processed, i.e., the function or feature associated with that key is executed. Upon completion of step 416, the operational software of controlling device 100 may next determine if a request for surface change is pending. If not, processing of the current key activation is complete. If a surface change request is pending, this may be processed at step 420 as previously described.

If however, at step 408 it is determined that the activated key is not located on the currently active surface, the determination must then be made if this is an inadvertent key press or if it is to be treated as a surface selection by implicit user action. Accordingly, in keeping with the method described earlier, the operational software of controlling device 100 may wait for a period of time to ascertain if the same key is activated again with no other intervening user activity. At step 410 the status "waiting for repeat" may thus be set, the current key value saved for future reference, and a timer started, after which processing of the current key activation is complete.

Returning now to step 402, if it is determined by the operational software of controlling device 100 that the current status of the controlling device is "waiting for repeat," then at step 404 the present key value may be compared to the key value which was saved earlier. If these do not match, no implicit user surface selection has occurred, and accordingly the "waiting for repeat" status is cleared at step 405, after which processing continues at step 406 as previously described. If however the current key value matches that stored previously in conjunction with the "waiting for repeat" status, an implicit user surface selection has occurred. Accordingly, at step 412 the running timer is stopped and any lower priority surface change requests are cleared, after which the current key input and implied surface change request are processed at steps 416 and 418 as previously described.

Referring now to step 426, should the timer which was set at step 410 expire due to no additional user input during the timed interval (which interval may be predetermined in certain embodiments, e.g., three seconds, or may be externally adjustable in other embodiments, e.g., by a user or by parameter received from a target appliance) then no implicit user surface selection is in progress and accordingly any "waiting for repeat" status is cleared at step 426, after which processing continues as step 418 as previously described, with a check for any pending lower priority surface change requests.

In embodiments of controlling device 100 which incorporate bi-directional communication with a host target appliance, request for enablement of a particular control surface may be received from a host appliance, i.e., at step 428 of FIG. 4. In this case, the operational software of controlling device 100 may first determine if a "waiting for repeat" status currently exists. If not, the host request may be processed immediately at step 420 as previously described. If however this status is set, then the operational software may defer any host requested surface enablement action pending the outcome of the higher priority in-progress test for an implicit user initiated change. Accordingly, at step 432 any pending lower priority (i.e. accelerometer initiated, in the illustrative embodiment) surface change requests are cleared, and at step 434 the pendency of a host request is logged for future evaluation at step 418 as previously described, and processing is complete.

In embodiments of controlling device 100 which incorporate accelerometer means, one application of the signals generated by the accelerometer may be determination of an orientation of controlling device, i.e., in the illustrative embodiment which side is currently facing generally upwards, and automatic activation of the appropriate control surface. As will be appreciated, each previous explicit or implicit user surface selection or other user activity may be used to establish a new baseline controlling device orientation and accelerometer signals accumulated thereafter to dynamically monitor a deviation from that baseline orientation. Beginning at step 436, when it is determined by the operational software of controlling device 100 that such deviation has reached a point at which a different control surface may require to be enabled, at step 438 it is first determined if a host request is currently pending. If so, since in the illustrative embodiment a host request takes priority, the accelerometer-derived request is to be ignored and processing is complete. If no host request is currently pending, at steps 440 and 442 a host appliance may be interrogated to determine if a request is presently outstanding and if so processing of this host request continues at step 430 as previously described. Steps 440 and 442 are necessary since, as will be described in greater detail hereafter, a hand held portable device such as the exemplary controlling device, even though capable of bi-directional communication, may not be in constant real-time contact with a host target appliance. If however no host request is determined to be pending, at step 444 it is next determined by the operational software of controlling device 100 if a "waiting for repeat" status currently exists. If not, the accelerometer request may be processed immediately at step 420 as previously described. If however this status is set, then the operational software may defer any requested surface enablement action pending the outcome of the in-progress test for an implicit user-initiated change. Accordingly, at step 446 the pendency of an accelerometer initiated request is logged for future evaluation at step 418 as previously described, and processing is complete.

It will also be appreciated that the signals derived from the accelerometer may be used to cause the device to indicate to a user, e.g., via a message displayed on a currently, upwardly facing display, a sound, or the like, that the device should be turned over, e.g., that the surface that was recently made currently active is not currently facing generally upwards.

Z-axis Navigation.

In certain embodiments, an accelerometer means 318 incorporated into a controlling device 100 may be used for z-axis navigation in a 3-D environment. For example, when navigating the exemplary 3-D program guide 506 illustrated in FIG. 5, movement of a cursor or highlight horizontally and vertically within a page of guide data displayed on TV 102 may be controlled by finger movement on a navigation input pad 108 utilizing capacitive sensing such as that described in the previously referenced U.S. patent application Ser. Nos. 12/552,761 and 12/645,037 or other suitable technology, while navigation in the Z-axis, e.g., from page to page, may be controlled by motions 504 of controlling device 100 along that axis, as illustrated. To this end, the operational software of controlling device 100 may analyze the data values reported by accelerometer 318 in order to distinguish, for example, between a motion 502 which may be indicative of a need to select a new active surface on the controlling device and should be processed as previously described, and a motion 504 which is indicative of z-axis navigation and should result in transmission of navigation commands or data to TV 102 (or STB 104, in the event STB is responsible for the displayed guide image). As will be appreciated, such z-axis navigation transmissions may take the form of individual step commands, e.g., page up, page down (which commands may be sent dependent upon the speed and/or length of the z-axis motion); may comprise raw motion data for interpretation by the target device, e.g., z-axis movements made to effect movement of a 3-D object in lieu of or in addition to distinguishable z-axis movements provided to effect paging; or may comprise a combination thereof. Furthermore, in embodiments of controlling device 100 capable of bi-directional communication with a target appliance, such z-axis navigation input and the form in which it is conveyed to the target appliance may be enabled/disabled and configured under control of the target appliance. It will also be appreciated that the accelerometer detected motions described herein are by way of illustration of specific concepts only and not intended to be limiting as to the general use and application of accelerometer data in a controlling device.

Deferred Transfer.

In the design of systems which support bi-directional communication with battery-powered and/or portable devices such as the exemplary controlling device of the instant invention, there can be no presumption that the device be continuously present, energized, and capable of receiving communications. In particular, battery powered devices of type contemplated herein generally enter into a low-power quiescent state when not in active use. In some instances this behavior may be accounted for by defining a system with a strict requirement that all interactions commence with transmission of a signal from the battery-powered device, thereby ensuring that it is not in a quiescent state at the time. However in applications such as those contemplated herein where asynchronous events in a host or target appliance may result in a requirement to indicate status to, or request a state change from, a battery powered controlling device, alternative provisions must be made. For example, an appliance such as TV 102 or STB 104 may asynchronously enter into a menu display upon reaching the end of playback of a prerecorded item, and may need to instruct a multi-surface controlling device 100 regarding an appropriate input surface to be enabled for user response when controlling device 100 is next active. Accordingly, a deferred transfer queuing method may be implemented in an appliance capable of engaging in bi-directional communication with controlling device 100, such an appliance hereafter referred to for convenience as a host appliance.

Figure 6:
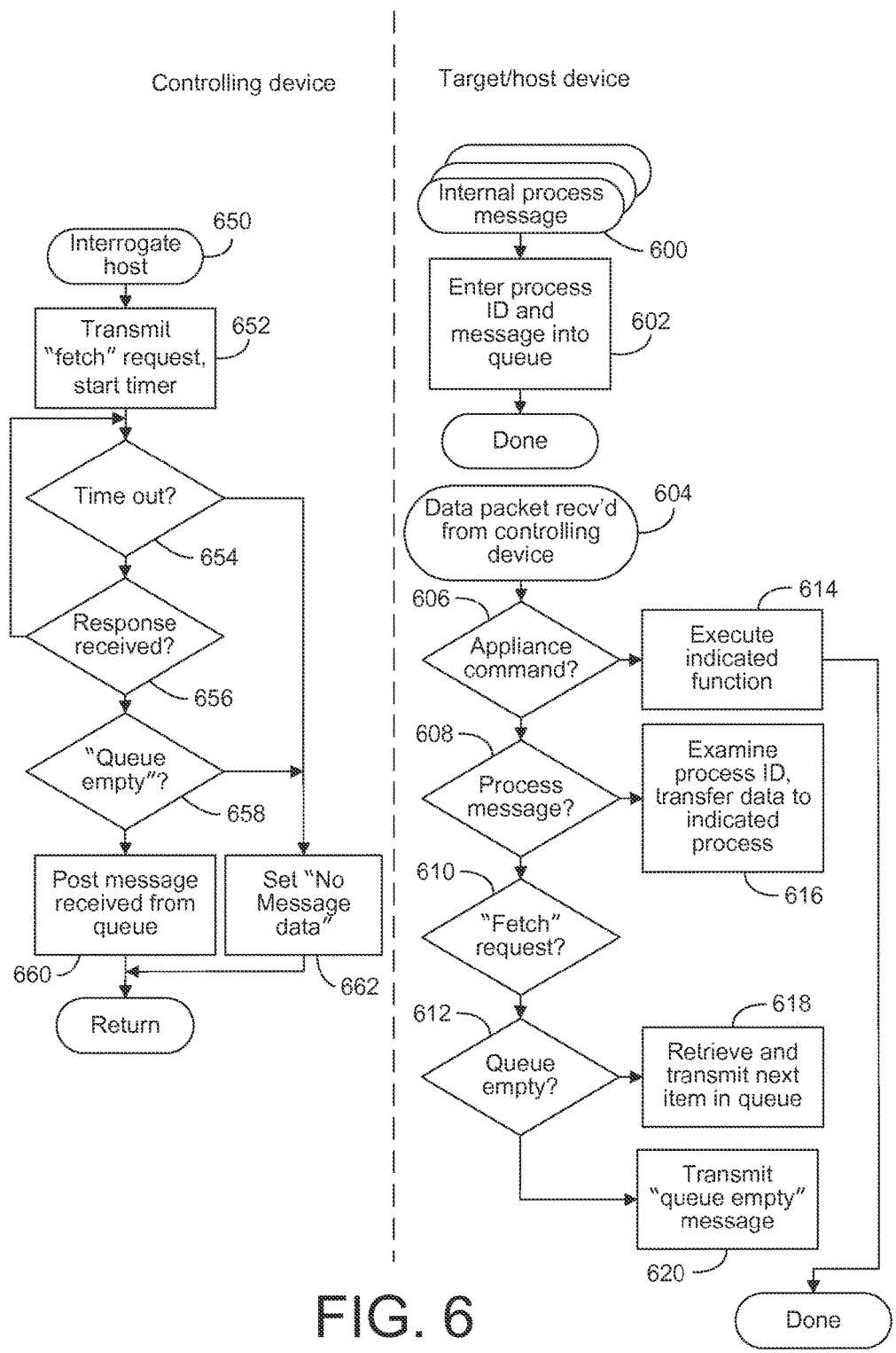
FIG. 6 illustrates in flow chart form an exemplary implementation of a deferred message queue and transfer method.

By way of example, with reference to the flowcharts of FIG. 6, any internal process 600 active in a host appliance, for instance a menuing system, timer, calendar reminder, program guide application, etc., which requires to communicate a message or request to controlling device 100, may at step 602 cause the operational software of the host appliance to enter the message data into a deferred transfer queue. In some embodiments, the data placed into the queue may include a process ID, i.e., an identity of the requesting process, which ID may be echoed in any subsequent response generated by controlling device 100 thus ensuring correct transfer of that response to the initiating host process.

When a next communication 604 from controlling device 100 is received by the exemplary host appliance, at step 606 the operational software of the host appliance may first inspect the contents of the received message to determine if it comprises an appliance command intended for that host appliance. If so, at step 614 the appropriate processes or actions necessary to perform the indicated function are initiated within the host appliance, and processing of the received message is complete. Though not illustrated in the flowchart of FIG. 4, it will be appreciated that in embodiments in which the command protocol between controlling device 100 and the host appliance may include an acknowledgement by the host appliance of the receipt and/or execution of commands, such acknowledgement may incorporate an indication to controlling device 100 of the status of the deferred transfer queue, i.e., "message pending" or "no messages pending." If the received message does not comprise an appliance command, at step 608 the operational software of the host appliance may next determine if the contents of the received message comprise data which is to be transferred to a particular process with the host appliance. If so, at step 616, the process ID returned with the data is examined and the data transferred to the appropriate originating process, after which received message processing is complete. If not, at step 610 the operational software of the host appliance may next determine if the contents of the received message comprise a fetch request, i.e., a request for transfer of an item from the deferred delivery queue. If not, processing of the received message is complete. If however a fetch request has been received, the operational software of the host appliance may next determine if any items are currently present in the deferred transfer queue. If so, at step 681 the next sequential item in the queue is retrieved and transmitted to controlling device 100. If not, a "queue empty" status message is transmitted to controlling device 100, after which received message processing is complete. It will be appreciated that while the illustrative methods described above implement a simple "first-in-first-out" deferred transfer queue, in other embodiments various alternative arrangements such as prioritization by category or process, time stamping, controlling device request classification, etc., may be implemented as appropriate.

With reference now to the controlling device portion of the flowchart of FIG. 6, beginning at step 650, controlling device 100 may from time to time interrogate a host appliance in order to retrieve messages from its deferred transfer queue. Such interrogation may be requested by one of several possible controlling device operational software processes for example without limitation, upon entry into or exit from a low power quiescent state; after certain user interactions with control surfaces 202, 204; upon accelerometer-generated events such a control surface change request (e.g., step 440 of FIG. 4) or detection of controlling device 100 being lifted off of a surface on which it is resting; etc. At step 652 a fetch request may be transmitted to a host appliance and a timeout started. At step 654, if the timeout expires without any response having been received from the host appliance, it is assumed that the host is out of range, powered down, or otherwise unresponsive, and at step 662 a "no message data" status is posted for the initiating process and the interrogation process is complete. If a response is received at step 656 from the target host appliance, at step 658 it may then be determined if that response comprises a host process generated message or a "queue empty" response. The appropriate data is then posted for the initiating process at step 660 or 662, and the interrogation process is complete.

In this manner, asynchronously generated commands, parameters, and event data may be reliably transferred from a host appliance to a portable controlling device operating under battery power conservation constraints. It will be appreciated that the above example is presented as an illustration of one possible method and protocol which may be employed to implement a deferred event queue and that various modifications may be made thereto without departing from the spirit of the invention. For example, while a request/response protocol is used in the transfer of queue items in the above illustrative embodiment, other methods such as a host initiated "push" upon detection of controlling device presence; repetitive periodic broadcast until acknowledgement; etc., may be used in alternative embodiments where appropriate.

Adjacent Key Suppression.

Figure 7:
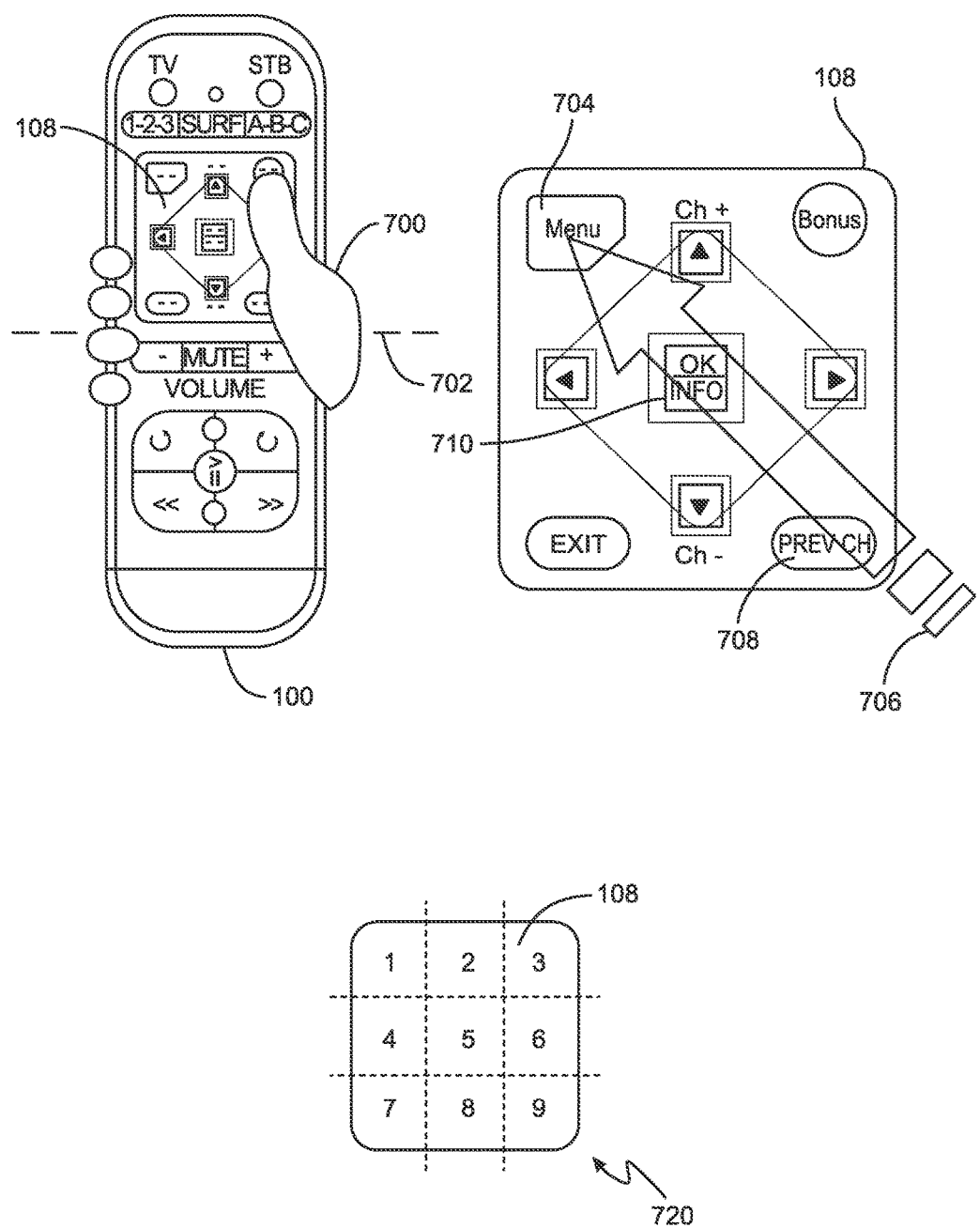
FIG. 7 illustrates the use of a touch sensitive surface of a controlling device for the input of discrete function commands.

Referring now to FIG. 7, when a capacitive or other touch sensitive surface 108 is employed as an input area on a controlling device 100, this area may commonly be placed above the natural grip point 702 of the controlling device 100, preferably positioned such that the majority of user input operations may be performed by a user's thumb 700 without requiring modification of their grip on the device. Accordingly, the reach 706 of the user's thumb when operating the controlling device may generally be bottom-up and, at least in the case of a right-handed user, right to left as illustrated.

In certain embodiments, such as for example that described in previously referenced U.S. patent application Ser. No. 12/645,037 which is incorporated herein by reference in its entirety, such a touch sensitive area may be used as a keypad entry means, either as its sole function, or interchangeably with a mode in which it is used as a gesture-based means to generate navigation or other commands to a target appliance. When used as a keypad, the touch sensitive area may be logically separated into several zones, for example zones one through nine as illustrated at 720, with each zone assigned a command key value. Detection of a user touch anywhere within a zone may result in actuation of the assigned key function, for example the transmission of a command to a target appliance. A disadvantage of using a touch sensitive area in this manner however, is that in reaching for a "key" a user's thumb may inadvertently actuate functions assigned to other regions of the touch sensitive area due to a fleeting touch or proximity. For example, a right-handed user reaching to actuate an exemplary "Menu" function 704, corresponding to zone 1, may inadvertently also actuate the "Previous Channel" function 708, corresponding to zone 9, and/or the "OK/Info" function corresponding to zone 5.

In order to alleviate false actuation of command functions in the manner described above, in an exemplary embodiment an adjacent key suppression method may be implemented. Advantageously, such a method may assume a user's grip to be in a similar position more often than not, based upon the particular ergonomics of the controlling device, and accordingly that the origin of the user's thumb reach will be from the same general area, e.g., the southeast quadrant of touch sensitive area 108 in the example illustrated in FIG. 7. When multiple near-simultaneous input values are detected, these may thus be accorded decoding priorities based upon an assumed origin of the user's reach. For example, with reference to the zone chart 720 of FIG. 7, in certain embodiments the upper zones may be assigned a higher priority than lower zones, i.e., the assigned priority sequence highest to lowest may simply be zones 1, 2, 3, 4, 5, 6, 7, 8, 9 in that order. Alternatively, in another illustrative embodiment decoding priorities may be based upon distance from the reach origin with those furthest away receiving the higher priority, i.e., the assigned priority sequence highest to lowest may be zones 1, 2, 4, 3, 7, 5, 6, 8, 9. In cases where the distances to more than one area are the same (or generally the same), a combination approach may be used whereby regions of the same distance are also assigned sub-priorities from highest to lowest. As will be appreciated other prioritizations are also possible, for example without limitation, in controlling devices which employ a different physical layout and/or ergonomics than those of the illustrative embodiments presented herein. Furthermore, the specific set of priorities to be used may be predetermined or variable based on operating mode of controlling device 100, may be selectable as a user preference, may be under the control of a host target appliance, etc., or a combination thereof as appropriate for a particular embodiment. It will also be appreciated that the software of the device may request that a user establish a home location during a configuration process (e.g., the user may be requested to place their hand upon the device as if the device is being used) whereupon the detected home location is used to establish such region priorities.

When the operating software of controlling device 100 detects multiple inputs upon touch surface 108 within a short time interval, for example 100 milliseconds or such other time as may appropriate, it being appreciated that this time interval may also be an adjustable parameter, these multiple inputs may be evaluated by the operating software of controlling device based upon the particular set of priorities then in effect, the lower priority input values discarded, and only the highest priority input acted upon, i.e., the function or feature associated with that "key" is executed. Alternatively, in embodiments such as that described in co-pending U.S. patent application Ser. No. 12/645,037 in which user actuation of a touch input is determined by separate means such as mechanical displacement of the touch surface, the inputs to be evaluated may be those determined to be present at the moment that actuation means is triggered. By way of example, with reference to FIG. 7, if the operating software of controlling device 100 determines that both the zone 5 "OK/Info" function 710 and the zone 1 "Menu" function 704 have been actuated within 100 milliseconds of one another (or such other time period as appropriate), then in accordance with the exemplary priority schemes presented above, the "OK/Info" function 710 input will be discarded and the "Menu" function 704 executed. It will also be appreciated that in some embodiments, if it is determined that the input corresponding to the highest priority zone has been actuated, that function may be executed immediately without delaying to ascertain if additional inputs are present, since those would be discarded in any event.

Figure 5:
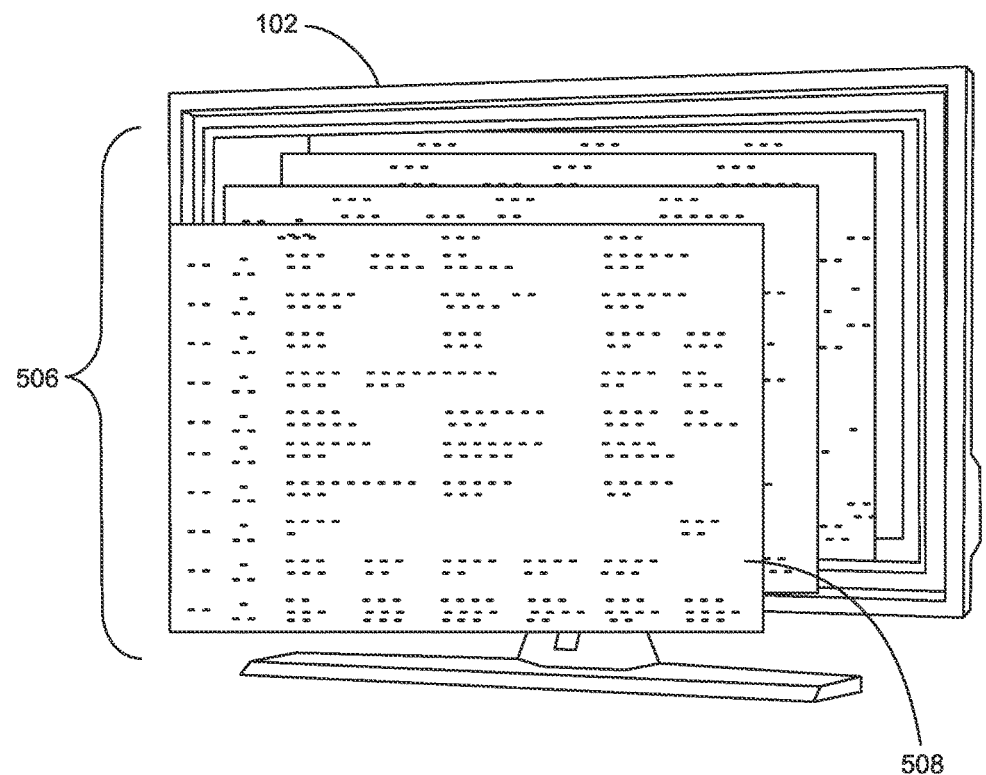
FIG. 5 illustrates an exemplary system in which an accelerometer equipped controlling device may be utilized.
Figure 5:
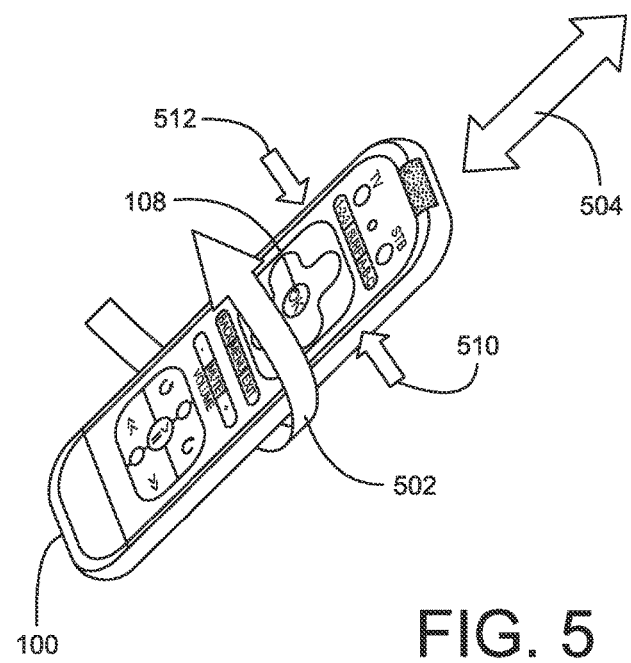

It will be appreciated that in some embodiments provision may be made for adjustment of zone priorities to adapt controlling device 100 to user handedness. For example, examination of the 1, 2, 4, 3, 7, 5, 6, 8, 9 priority sequence mentioned above with reference to the exemplary zone layout 720 will reveal that this sequence assumes a user reach which originates from the southeast quadrant, i.e., a right-handed user. For a left-handed user, an equivalent priority sequence for a southwest reach origin may be 3, 2, 6, 1, 9, 5, 4, 8, 7. Selection of a left- or right-handed mode of operation may be made during initial setup of controlling device 100, for example by entry of a particular key sequence on keypad 106. In embodiments of controlling device 100 which include accelerometer means 318, as an alternative to entry of a key sequence a user may be instructed to tap the side of controlling device with a thumb or forefinger and the resulting accelerometer data evaluated to determine the direction of the tap, e.g. 510 or 512 as illustrated in FIG. 5. Furthermore, controlling device embodiments which support multiple user configurations, selected either automatically using biometric user detection means such as those described in U.S. Pat. Nos. 6,256,019 or 7,236,156 both of which are incorporated herein by reference in their entirety, or by explicit user input, may support multiple sets of priority parameters to cater for differing use preferences or handedness.

While various concepts have been described in detail, it will be appreciated by those skilled in the art that various modifications and alternatives to those concepts could be developed in light of the overall teachings of the disclosure. For example, while described in the exemplary context of a controlling device such as a remote control, it will be appreciated that the principles and concepts described herein may be applied to any device that receives inputs and/or outputs communications, such as, PDAs, portable computers, phones, game controllers, portable gaming device, computer peripherals, and the like. Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A hand-held device comprising:
   a housing having a top surface and a bottom surface opposite the top surface;
   at least one transmitter carried by the housing;
   a receiver carried by the housing;
   a first user interface associated with the top surface of the housing having first user interface input elements which, when active, are actuatable to cause the at least one transmitter to transmit communications to an external device, a second user interface associated with the bottom surface of the housing having second user interface input elements which, when active, are actuatable to cause the at least one transmitter to transmit communications to an external device, a method for making one of the first user interface input elements of the first user interface and the second user interface input elements of the second user interface active while making the other of the first user interface input elements of the first user interface and the second user interface input elements of the second user interface inactive; and
   a non-transitory, computer readable media having instructions stored thereon which instructions, when executed by the hand-held device, cause the hand-held device to perform steps comprising:
   receiving from an external device a selection signal;
   using the selection signal received from the external device to make one of the first user interface and the second user interface active;
   making the other of the first user interface and the second user interface inactive;
   causing a transmission of a signal to the external device in response to an activation of a user interface input element of the active one of the first user interface and second user interface.

2. The hand-held device as recited in claim 1, wherein at least one of the first user interface and the second user interface comprises a touch sensitive input element.

3. The hand-held device as recited in claim 1, wherein the second user interface input elements comprise a qwerty keypad and the first user interface input elements comprise a remote control keypad.

4. The hand-held device as recited in claim 1, wherein the at least one transmitter is caused to transmit command data communications to the external device in response to an actuation of the first user interface input elements and wherein the at least one transmitter is caused to transmit alphanumeric data communications to the external device in response to an actuation of the second user interface input elements.

5. A hand-held device comprising:
   a housing having a top surface and a bottom surface opposite the top surface;
   at least one transmitter carried by the housing;
   a receiver carried by the housing;
   a first user interface associated with the top surface of the housing having first user interface input elements which, when active, are actuatable to cause the at least one transmitter to transmit communications to an external device, a second user interface associated with the bottom surface of the housing having second user interface input elements which, when active, are actuatable to cause the at least one transmitter to transmit communications to an external device, a method for making one of the first user interface input elements of the first user interface and the second user interface input elements of the second user interface active while making the other of the first user interface input elements of the first user interface and the second user interface input elements of the second user interface inactive; and
   a non-transitory, computer readable media having instructions stored thereon which instructions, when executed by the hand-held device, cause the hand-held device to perform steps comprising:
   receiving from a user activatable toggled input element of at least one of the first user interface and the second user interface a toggle selection signal;
   using the toggle selection signal to make one of the first user interface and the second user interface active; and
   making the other of the first user interface and the second user interface inactive.

6. The hand-held device as recited in claim 5, wherein at least one of the first user interface and the second user interface comprises a touch sensitive input element.

7. The hand-held device as recited in claim 5, wherein the second user interface input elements comprise a qwerty keypad and the first user interface input elements comprise a remote control keypad.

8. A hand-held device comprising:
   a housing having a top surface and a bottom surface opposite the top surface;
   at least one transmitter carried by the housing;
   a receiver carried by the housing;
   a first user interface associated with the top surface of the housing having first user interface input elements which, when active, are actuatable to cause the at least one transmitter to transmit communications to an external device, a second user interface associated with the bottom surface of the housing having second user interface input elements which, when active, are actuatable to cause the at least one transmitter to transmit communications to an external device, a method for making one of the first user interface input elements of the first user interface and the second user interface input elements of the second user interface active while making the other of the first user interface input elements of the first user interface and the second user interface input elements of the second user interface inactive; and a non-transitory, computer readable media having instructions stored thereon which instructions, when executed by the hand-held device, cause the hand-held device to perform steps comprising:

using a repeated actuation of a user interface input element of the first user interface and the second user interface within a predetermined period of time to determine which one of the first user interface and the second user interface active; and making the determined one of the first user interface and the second user interface active while making the other of the first user interface and the second user interface inactive.

9. The hand-held device as recited in claim 8, wherein at least one of the first user interface and the second user interface comprises a touch sensitive input element.

10. The hand-held device as recited in claim 8, wherein the second user interface input elements comprise an alphanumeric keypad and the first user interface input elements comprise a remote control keypad.

* * * * *